(12) United States Patent
Mizukami et al.

(10) Patent No.: US 11,186,037 B2
(45) Date of Patent: Nov. 30, 2021

(54) MANUFACTURING METHOD AND FORMING APPARATUS OF THREE-DIMENSIONAL FORMED OBJECT

(71) Applicant: Seiko Epson Corporation, Tokyo (JP)

(72) Inventors: Shunsuke Mizukami, Hokuto (JP); Kazuhide Nakamura, Asahi (JP); Kohei Yuwaki, Shiojiri (JP); Koichi Saito, Matsumoto (JP)

(73) Assignee: Seiko Epson Corporation

( * ) Notice: Subject to any disclaimer, the term of this patent is extended or adjusted under 35 U.S.C. 154(b) by 309 days.

(21) Appl. No.: 16/280,123

(22) Filed: Feb. 20, 2019

(65) Prior Publication Data
US 2019/0255772 A1 Aug. 22, 2019

(30) Foreign Application Priority Data
Feb. 21, 2018 (JP) .............................. JP2018-028531

(51) Int. Cl.
| | | |
|---|---|---|
| *B29C 64/245* | (2017.01) | |
| *B29C 64/112* | (2017.01) | |
| *B29C 64/209* | (2017.01) | |
| *B29C 64/106* | (2017.01) | |
| *B22F 10/20* | (2021.01) | |
| *B33Y 40/00* | (2020.01) | |
| *B33Y 10/00* | (2015.01) | |
| *B33Y 30/00* | (2015.01) | |

(52) U.S. Cl.
CPC ............ *B29C 64/245* (2017.08); *B22F 10/20* (2021.01); *B29C 64/106* (2017.08); *B29C 64/112* (2017.08); *B29C 64/209* (2017.08); *B22F 2999/00* (2013.01); *B33Y 10/00* (2014.12); *B33Y 30/00* (2014.12); *B33Y 40/00* (2014.12)

(58) Field of Classification Search
CPC ... B29C 64/245; B29C 64/106; B29C 64/112; B29C 64/209; B33Y 10/00
See application file for complete search history.

(56) References Cited

U.S. PATENT DOCUMENTS

| | | | |
|---|---|---|---|
| 2008/0118655 A1* | 5/2008 | Kritchman | ............ B29C 64/106 427/427.3 |
| 2011/0304074 A1* | 12/2011 | Wang | ..................... B33Y 10/00 264/296 |
| 2012/0308805 A1* | 12/2012 | Sella | ..................... B29C 64/112 428/222 |
| 2020/0331195 A1* | 10/2020 | Rumbak | ................ B33Y 10/00 |

FOREIGN PATENT DOCUMENTS

| | | |
|---|---|---|
| JP | H05-301293 A | 11/1993 |
| JP | 2016-165814 A | 9/2016 |

* cited by examiner

*Primary Examiner* — Joseph S Del Sole
*Assistant Examiner* — Mohamed K Ahmed Ali
(74) *Attorney, Agent, or Firm* — Harness, Dickey & Pierce, P.L.C.

(57) ABSTRACT

A manufacturing method of a three-dimensional formed object includes disposing a first forming material on a forming table to form a plurality of structures which are separated from each other, and disposing a second forming material for forming the three-dimensional formed object such that the three-dimensional formed object is supported by the plurality of structures in a state of being separated from the forming table.

6 Claims, 7 Drawing Sheets

MANUFACTURING METHOD AND FORMING APPARATUS OF THREE-DIMENSIONAL FORMED OBJECT

This application claims priority under 35 U.S.C. § 119 to Japanese Patent Application No. 2018-028531 filed on Feb. 21, 2018, the entire disclosure of which is expressly incorporated by reference herein.

BACKGROUND

1. Technical Field

The present invention relates to a manufacturing method of a three-dimensional formed object.

2. Related Art

There is known a solid object forming apparatus which forms a three-dimensional formed object by disposing a material which is obtained by plasticizing and melting a thermoplastic material such as a resin at a desired position on a forming table and curing the material. In the forming apparatus, although the three-dimensional formed object is fixed to the forming table during the forming, there is a case in which a bed also referred to as a raft is formed on the forming table in advance to facilitate the separation of the three-dimensional formed object from the forming table after the forming is completed. For example, JP-A-2016-165814 discloses a technique of forming a bed of a three-dimensional formed object by applying a resin material to a forming table in a mesh-shape using a single brush-stroke.

In this manner, the bed of JP-A-2016-165814 has a configuration of being integrally connected in a mesh-shape to cover a base surface of the three-dimensional formed object. Therefore, the strength of the bed itself is increased, the contact area of the bed with respect to the forming table and the three-dimensional formed object is increased, and there is a case in which the separation of the three-dimensional formed object from the forming table and the removal of the bed from the three-dimensional formed object become difficult. The bed of JP-A-2016-165814 is formed using complicated nozzle scanning in which the nozzle corners in a zigzag pattern and is not efficient. In this manner, there is still room for improvement in the bed when forming the three-dimensional formed object.

SUMMARY

An advantage of some aspects of the invention is to provide a manufacturing method of a three-dimensional formed object. The manufacturing method includes a first disposing of a first forming material on a forming table to form a plurality of structures which are separated from each other, and a second disposing of a second forming material for forming the three-dimensional formed object such that the three-dimensional formed object is supported by the plurality of structures in a state of being separated from the forming table.

BRIEF DESCRIPTION OF THE DRAWINGS

The invention will be described with reference to the accompanying drawings, wherein like numbers reference like elements.

DESCRIPTION OF EXEMPLARY EMBODIMENTS

1. First Embodiment

Figure 1:
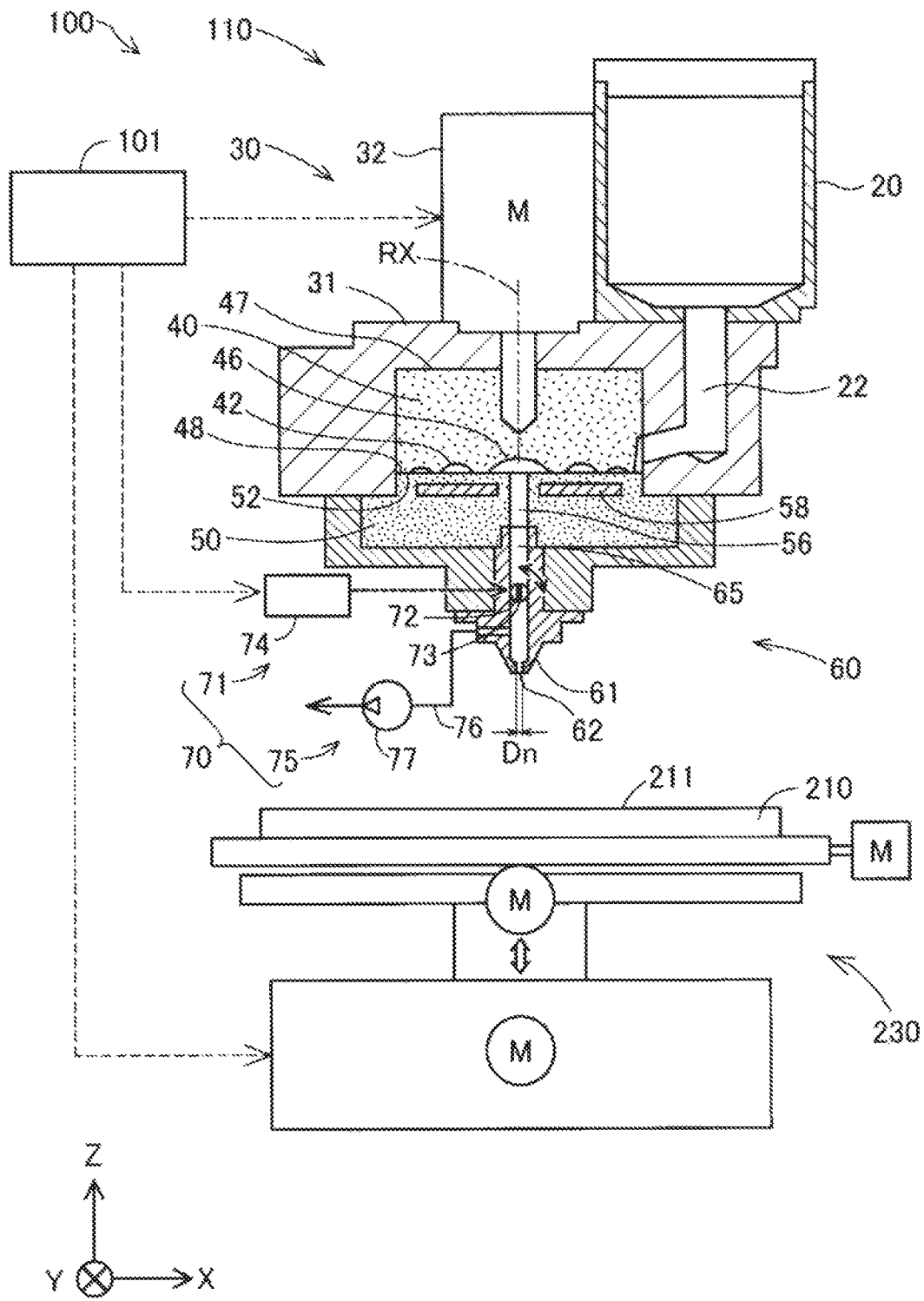
FIG. 1 is a schematic diagram illustrating the configuration of a three-dimensional forming apparatus.

FIG. 1 is a schematic diagram illustrating the configuration of a three-dimensional forming apparatus 100 which is suitable for executing the manufacturing method of a three-dimensional formed object in the first embodiment. In FIG. 1, arrows are depicted indicating X, Y, and Z directions which orthogonally intersect each other. In the first embodiment, the X direction and the Y direction are directions which are parallel to a horizontal plane, and the Z direction is an opposite direction from a gravity direction (a plumb direction). The arrows indicating the X, Y, and Z directions are also depicted, as appropriate, in the other reference drawings such that the depicted directions correspond to those of FIG. 1.

The three-dimensional forming apparatus 100 forms a three-dimensional formed object by disposing a forming material to be stacked. Hereinafter, "the three-dimensional forming apparatus" will also be referred to as simply "the forming apparatus" and the three-dimensional formed object will also be referred to as simply "the formed object". The forming apparatus 100 is provided with a control unit 101, a forming unit 110, a forming table 210, and a movement mechanism 230.

The control unit 101 controls the overall operation of the forming apparatus 100 and executes a forming process which forms the formed object. In the first embodiment, the control unit 101 is configured by a computer which is provided with one or a plurality of processors and a main memory device. The control unit 101 exhibits various functions by the processor executing a program or commands which are read onto the main memory device. The control unit 101 may be realized by a configuration in which a plurality of circuits for realizing each function are combined instead of configuring the control unit 101 using a computer.

The forming unit 110 disposes a forming material, which is obtained by melting at least a portion of a material to render the material paste form, on the forming table 210. The forming unit 110 is provided with a material supply unit 20, a forming material generating unit 30, and a discharging unit 60.

The material supply unit 20 supplies the material to the forming material generating unit 30. The material supply unit 20 is configured by a hopper which stores the material, for example. The material supply unit 20 includes a discharge port on the bottom of the material supply unit 20 and the discharge port is connected to the forming material generating unit 30 via a communicating path 22. The material is inserted into the material supply unit 20 in a solid material state such as pellets or a powder. The material which is input into the material supply unit 20 will be described later.

The forming material generating unit 30 generates a fluid paste-form forming material which is obtained by melting at least a portion of a material which is supplied from the material supply unit 20 and guides the forming material to the discharging unit 60. The forming material generating unit 30 includes a screw case 31, a drive motor 32, a flat screw 40, and a screw surface facing portion 50.

The flat screw 40 has a substantially columnar shape in which the height in the axial direction, which is a direction along the center axis, is smaller than the diameter. The flat screw 40 is disposed such that the axial direction is parallel to the Z direction and the flat screw 40 rotates along a circumferential direction. In the first embodiment, the center axis of the flat screw 40 matches a rotational axis RX of the flat screw 40. In FIG. 1, the rotational axis RX of the flat screw 40 is depicted using a dot-dash line.

The flat screw 40 is stored inside the screw case 31. A top surface 47 side of the flat screw 40 is connected to the drive motor 32 and the flat screw 40 rotates inside the screw case 31 due to a rotational driving force which is generated by the drive motor 32. The drive motor 32 is driven under the control of the control unit 101.

In the flat screw 40, groove portions 42 are formed in a bottom surface 48 which is a surface which intersects the rotational axis RX. The communicating path 22 of the material supply unit 20 which is described above is connected to the groove portions 42 from the side surface of the flat screw 40.

The bottom surface 48 of the flat screw 40 faces a top surface 52 of the screw surface facing portion 50 and a space is formed between the groove portions 42 of the bottom surface 48 of the flat screw 40 and the top surface 52 of the screw surface facing portion 50. In the forming unit 110, the material is supplied from the material supply unit 20 in the space between the flat screw 40 and the screw surface facing portion 50. A description will be given later of the specific configuration of the flat screw 40 and the groove portions 42.

A heater 58 for heating the material is embedded in the screw surface facing portion 50. At least a portion of the material which is supplied into the groove portions 42 of the flat screw 40 which is rotating flows along the groove portions 42 while being melted and is guided to a center portion 46 of the flat screw 40 according to the rotation of the flat screw 40. The paste-form material which flows into the center portion 46 is supplied to the discharging unit 60 as the forming material via a communicating hole 56 which is provided in the center of the screw surface facing portion 50.

The discharging unit 60 includes a nozzle 61, a flow path 65, and a discharge control mechanism 70. The nozzle 61 is connected to the communicating hole 56 of the screw surface facing portion 50 through the flow path 65. The flow path 65 is a flow path of the forming material between the flat screw 40 and the nozzle 61. The nozzle 61 discharges the forming material which is generated in the forming material generating unit 30 toward the forming table 210 from a discharge port 62 of the tip of the nozzle 61. In the first embodiment, the discharge port 62 of the nozzle 61 has a substantially circular opening shape and has a bore diameter Dn.

The discharge control mechanism 70 controls the flowing out of the forming material from the nozzle 61. In the first embodiment, the discharge control mechanism 70 includes an opening-closing mechanism 71 which opens or closes the flow path 65, and a suction mechanism 75 which sucks the forming material inside the nozzle 61.

The opening-closing mechanism 71 opens and closes the flow path 65 to control the flow of the forming material from the flow path 65 into the nozzle 61. In the first embodiment, the opening-closing mechanism 71 is configured by a butterfly valve. The opening-closing mechanism 71 is provided with a drive shaft 72, a valve body 73, and a valve drive unit 74.

The drive shaft 72 is a shaft-shaped member which extends in one direction. The drive shaft 72 is attached to the exit of the flow path 65 to intersect the flow direction of the forming material. In the first embodiment, the drive shaft 72 is attached to be perpendicular to the flow path 65. In FIG. 1, the drive shaft 72 is perpendicular to the paper surface. The drive shaft 72 is attached to be capable of rotating centered on a center axis of the drive shaft 72.

The valve body 73 is a plate-shaped member which rotates inside the flow path 65. In the first embodiment, the valve body 73 is formed by machining a part which is disposed inside the flow path 65 of the drive shaft 72 into a plate shape. The shape of the valve body 73, when viewed in a direction which is perpendicular to the plate surface, substantially matches the opening shape of the flow path 65 at the part at which the valve body 73 is disposed.

The valve drive unit 74 generates a rotational driving force which rotates the drive shaft 72 under the control of the control unit 101. The valve drive unit 74 is configured by a stepping motor, for example. The valve body 73 rotates inside the flow path 65 according to the rotation of the drive shaft 72.

As illustrated in FIG. 1, a state in which the plate surface of the valve body 73 runs parallel to the flow direction of the forming material in the flow path 65 is a state in which the flow path 65 is open. In this state, the flowing of the forming material from the flow path 65 into the nozzle 61 is allowed. A state in which the plate surface of the valve body 73 is perpendicular to the flow direction of the forming material in the flow path 65 is a state in which the flow path 65 is closed. In this state, the flowing of the forming material from the flow path 65 into the nozzle 61 is blocked.

The suction mechanism 75 includes a branching flow path 76 and a suction pump 77. The branching flow path 76 is connected to the flow path of the forming material inside the nozzle 61 on the downstream side of the valve body 73 of the opening-closing mechanism 71. The suction pump 77 is provided in the branching flow path 76. The suction pump 77 is driven under the control of the control unit 101 and sucks the forming material inside the nozzle 61 into the branching flow path 76. The control unit 101 closes the flow path 65 using the opening-closing mechanism 71 and sucks the forming material inside the nozzle 61 using the suction mechanism 75 to generate a negative pressure inside the nozzle 61 such that the forming material does not flow out from the nozzle 61 while the discharging of the forming material from the nozzle 61 is stopped. The discharging unit 60 may be provided with a circulation path which returns the forming material which is sucked by the suction mechanism 75 to the flow path 65 on the upstream side of the opening-closing mechanism 71.

The forming table 210 is disposed at a position facing the discharge port 62 of the nozzle 61. The forming table 210 includes a top surface 211 which is disposed to be parallel to the X and Y directions. As described later, in the forming apparatus 100, the forming material on the top surface 211 of the forming table 210 is cured to form the formed object.

The forming table 210 is moved with respect to the nozzle 61 of the forming unit 110 by the movement mechanism 230. The movement mechanism 230 is configured by a three-axis positioner which causes the forming table 210 to move in the three axial directions of the X, Y, and Z directions using the driving force of three motors M. Under the control of the control unit 101, the movement mechanism 230 modifies the relative positional relationship between the nozzle 61 and the forming table 210. In the forming apparatus 100, instead of a configuration in which the forming table 210 is moved by the movement mechanism 230, a configuration may be adopted in which the movement mechanism 230 moves the position of the nozzle 61 with respect to the forming table 210 in a state in which the position of the forming table 210 is fixed. Even in this configuration, it is possible to modify the relative positional relationship between the nozzle 61 and the forming table 210.

Figure 2:
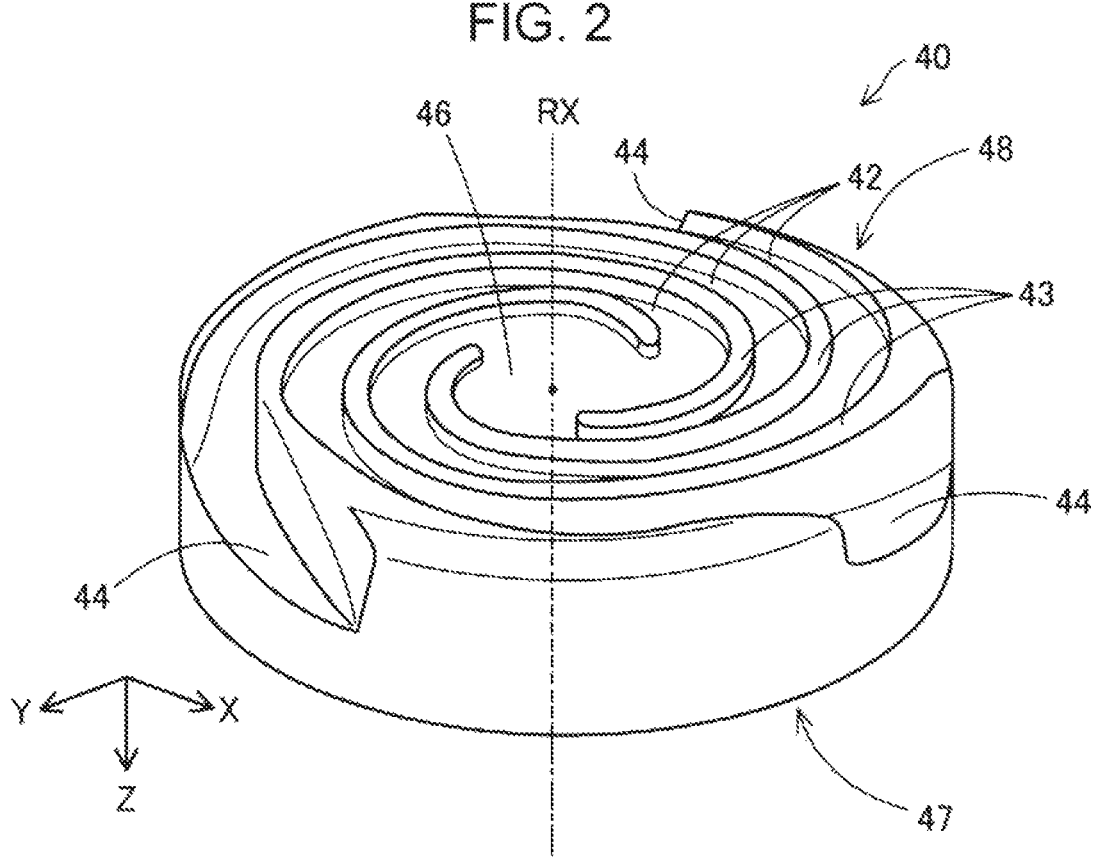
FIG. 2 is a schematic perspective view illustrating the configuration of a flat screw.

FIG. 2 is a schematic perspective view illustrating the configuration of the bottom surface 48 side of the flat screw 40. In FIG. 2, the position of the rotational axis RX of the flat screw 40 during the rotation in the forming material generating unit 30 is depicted using a dot-dash line. As explained with reference to FIG. 1, the groove portions 42 are provided in the bottom surface 48 of the flat screw 40 which faces the screw surface facing portion 50. Hereinafter, the bottom surface 48 will also be referred to as "the groove forming surface 48".

The center portion 46 of the groove forming surface 48 of the flat screw 40 is configured as a recessed portion to which one end of each of the groove portions 42 is connected. The center portion 46 faces the communicating hole 56 of the screw surface facing portion 50 which is depicted in FIG. 1. In the first embodiment, the center portion 46 intersects the rotational axis RX.

The groove portions 42 of the flat screw 40 configure so-called scroll grooves. Each of the groove portions 42 extends in a spiral shape to draw an arc from the center portion 46 toward the outer circumference of the flat screw 40. The groove portions 42 may be configured to extend in a helical shape. Ridge portions 43 which configure side wall portions of the groove portions 42 and extend along each of the groove portions 42 are provided on the groove forming surface 48.

The groove portions 42 continue to a material inflow port 44 which is formed in the side surface of the flat screw 40. The material inflow port 44 is a portion which accepts the material which is supplied via the communicating path 22 of the material supply unit 20.

When the flat screw 40 rotates, at least a portion of the material which is supplied from the material inflow port 44 is melted while being heated inside the groove portions and the fluidity increases. The material flows to the center portion 46 through the groove portions 42, gathers at the center portion 46, and is guided to the nozzle 61 and is discharged from the discharge port 62 by the internal pressure which is generated by the gathering.

FIG. 2 illustrates an example of the flat screw 40 which includes three of the groove portions 42 and three of the ridge portions 43. The number of the groove portions 42 and the ridge portions 43 which are provided on the flat screw 40 is not limited to three. Only one of the groove portions 42 may be provided on the flat screw 40, and a plurality greater than or equal to two of the groove portions 42 may be provided on the flat screw 40. A predetermined number of the ridge portions 43 may be provided to match the number of the groove portions 42.

FIG. 2 illustrates an example of the flat screw 40 in which the material inflow port 44 is formed at three locations. The number of the material inflow ports 44 which are provided in the flat screw 40 is not limited to the three locations. The material inflow port 44 may be provided at only the one location in the flat screw 40, and may be provided at a plurality of greater than or equal to two locations.

Figure 3:
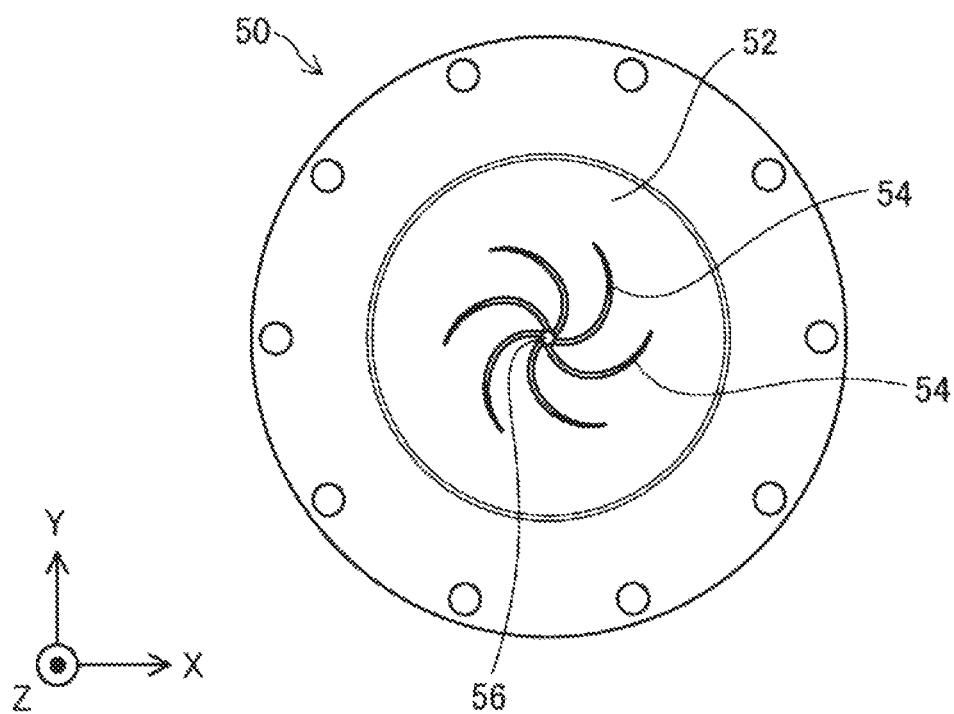
FIG. 3 is a schematic plan view illustrating the configuration of a screw surface facing portion.

FIG. 3 is a schematic perspective view illustrating the top surface 52 side of the screw surface facing portion 50. As described above, the top surface 52 of the screw surface facing portion 50 faces the groove forming surface 48 of the flat screw 40. Hereinafter, the top surface 52 will also be referred to as "the screw facing surface 52". The communicating hole 56 (described above) for supplying the forming material to the nozzle 61 is formed in the center of the screw facing surface 52.

A plurality of guide grooves 54 which are connected to the communicating hole 56 and extend in a spiral shape from the communicating hole 56 toward the outer circumference are formed in the screw facing surface 52. The plurality of guide grooves 54 have a function of guiding the forming material to the communicating hole 56. As explained with reference to FIG. 1, the heater 58 for heating the material is embedded in the screw surface facing portion 50. The melting of the material in the forming material generating unit 30 is realized through the heating by the heater 58 and the rotation of the flat screw 40.

Reference will be given to FIG. 1. By using the flat screw 40 which has a small size in the Z direction in the forming unit 110, the area occupied in the Z direction by the path for melting and guiding at least a portion of the material to the nozzle 61 is reduced. In this manner, by using the flat screw 40 in the forming apparatus 100, the generation mechanism of the forming material is reduced in size.

By using the flat screw 40 in the forming apparatus 100, the configuration which blows the forming material in the fluid state into the flow path 65 is easily realized. The discharge control of the forming material by the discharge control mechanism 70 of a simple configuration which is provided downstream of the flow path 65 becomes possible. Therefore, the precision of the discharge control of the forming material from the nozzle 61 is increased.

A description will be given of the material which is used in the forming apparatus 100. In the forming apparatus 100, it is possible to form the formed object using various materials such as a material having plasticity, a metal material, or a ceramic material, for example, as a main material. Here, "the main material" means a material which is central to forming the shape of the formed object and means a material which occupies a content of greater than or equal to 50 wt % in the formed object. The forming material which is described above includes a forming material in which the main materials described above are melted in isolation, and a forming material in which a component which is a portion contained together with the main material is melted and rendered paste form.

In a case in which a thermoplastic material is used as the main material, the forming material is generated by the material being plasticized in the forming material generating unit 30. The term "plasticize" means a heat is applied to the thermoplastic material and the material is melted.

It is possible to use a thermoplastic resin material, for example, as the thermoplastic material.

Examples of Thermoplastic Resin Material

General purpose engineering plastics such as polypropylene resin (PP), polyethylene resin (PE), polyacetal resin (POM), polyvinyl chloride resin (PVC), polyamide resin (PA), acrylonitrile-butadiene-styrene resin (ABS), polylactic acid resin (PLA), polyphenylene sulfide resin (PPS), polyether ether ketone (PEEK), polycarbonate (PC), modified polyphenylene ether, polybutylene terephthalate, and polyethylene terephthalate. Engineering plastics such as polysulfone, polyethersulfone, polyphenylene sulfide, polyarylate, polyimide, polyamide imide, polyether imide, and polyether ether ketone.

In addition to pigments, metals, and ceramics, additives such as wax, flame retardant, antioxidant, thermal stabilizer may be mixed into the thermoplastic material. The thermoplastic material is plasticized by the rotation of the flat screw 40 and the heating of the heater 58 in the forming material generating unit 30 and is transformed to a melted state. The forming material which is generated in this manner is disposed on the forming table 210 and is subsequently cured by a reduction in temperature.

It is desirable that the thermoplastic material be heated to a glass transition point or greater and be ejected from the nozzle 61 in a completely melted state. For example, the glass transition point of ABS resin is approximately 120° C. and it is desirable that the ABS resin be approximately 200° C. at the time of ejection from the nozzle 61. A heater may be provided in the periphery of the nozzle 61 in order to eject the forming material in such a high-temperature state.

In the forming apparatus 100, the following metal materials may be used as the main material, for example, instead of the thermoplastic material which is described above. In this case, it is desirable that a component which melts during the generation of the forming material be mixed into a powder material obtained by rendering the following metal materials into a powder form and the result be inserted into the forming material generating unit 30.

Examples of Metal Material

A single metal or an alloy containing one or more metals from among magnesium (Mg), iron (Fe), cobalt (Co), chrome (Cr), aluminum (Al), titanium (Ti), copper (Cu), and nickel (Ni).

Examples of Alloy

Maraging steel, stainless steel, cobalt chromium molybdenum, titanium alloy, nickel alloy, aluminum alloy, cobalt alloy, and cobalt chromium alloy.

It is possible to use a ceramic material as the main material instead of the metal material in the forming apparatus 100. For example, it is possible to use oxide ceramics such as silicon dioxide, titanium dioxide, aluminum oxide, and zirconium oxide, and non-oxide ceramics such as aluminum nitride as the ceramic material. In a case in which a metal material or a ceramic material such as those described above is used as the main material, the forming material which is disposed on the forming table 210 may be cured by sintering.

The powder material of the metal material or the ceramic material which is inserted into the material supply unit 20 may be a mixed material in which a plurality of types of powders of a single metal, powders of alloys, and powders of ceramic material are mixed together. The powder material of the metal material or the ceramic material may be coated with a thermoplastic resin such as those exemplified above, or alternatively, a different thermoplastic resin, for example. In this case, in the forming material generating unit 30, the fluidity may be realized by melting the thermoplastic resin.

It is possible to add the following solvents, for example, to the powder material of the metal material or the ceramic material which is inserted into the material supply unit 20. It is possible to use one species or two or more species in combination in combination as the solvent.

Examples of Solvent

Water; (poly) alkylene glycol monoalkyl ethers such as ethylene glycol monomethyl ether, ethylene glycol monoethyl ether, propylene glycol monomethyl ether, and propylene glycol monoethyl ether; acetic acid esters such as ethyl acetate, n-propyl acetate, iso-propyl acetate, n-butyl acetate, and iso-butyl acetate; aromatic hydrocarbons such as benzene, toluene, and xylene; ketones such as methyl ethyl ketone, acetone, methyl isobutyl ketone, ethyl n-butyl ketone, diisopropyl ketone, and acetyl acetone; alcohols such as ethanol, propanol, and butanol; tetraalkyl ammonium acetates; sulfoxide solvents such as dimethyl sulfoxide, and diethyl sulfoxide; pyridine-based solvents such as pyridine, γ-picoline, and 2,6-lutidine; tetraalkyl ammonium acetate (for example, tetrabutyl ammonium acetate or the like); and ionic liquids such as butyl carbitol acetate.

It is possible to add the following binders, for example, to the powder material of the metal material or the ceramic material which is inserted into the material supply unit 20.

Examples of Binder

Acrylic resin, epoxy resin, silicone resin, cellulose resin, or alternatively, another synthetic resin or polylactic acid (PLA), polyamide (PA), polyphenylene sulfide (PPS), polyether ether ketone (PEEK), or alternatively, another thermoplastic resin.

Figure 4:
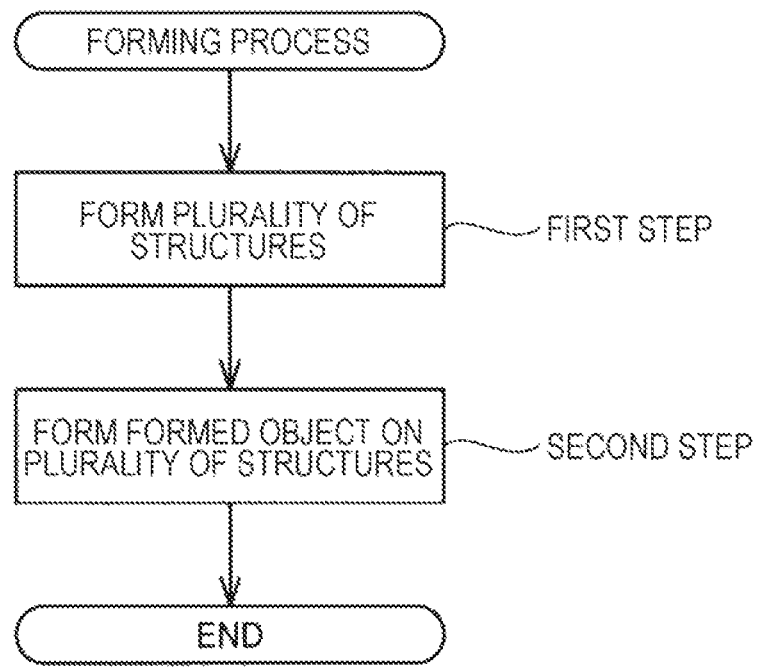
FIG. 4 is an explanatory diagram illustrating the flow of a forming process.
Figure 5:
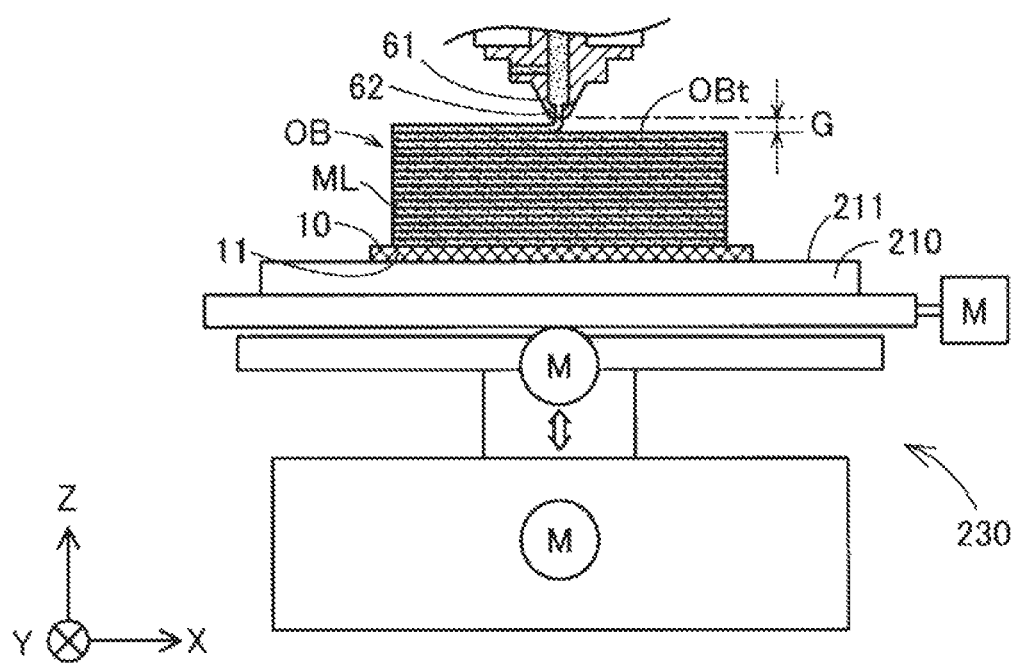
FIG. 5 is a schematic diagram schematically illustrating a state during the forming in a forming apparatus.

A description will be given of the forming process which is executed by the forming apparatus 100 with reference to FIGS. 4 and 5. FIG. 4 is an explanatory diagram illustrating the flow of the forming process which is executed by the forming apparatus 100. FIG. 5 is a schematic diagram schematically illustrating a state of the forming process in the forming apparatus 100.

In a first step, the control unit 101 forms a substrate layer 10 which serves as the bed of a formed object OB on the forming table 210. The substrate layer 10 is configured by a plurality of structures 11 which are separated from each other and are formed by disposing a first forming material on the top surface 211 of the forming table 210 using the forming unit 110 and curing the first forming material. In FIG. 5, the depiction of the individual structures 11 among the plurality of structures 11 which configure the substrate layer 10 is omitted for convenience. The substrate layer 10 is formed in a region in which the formed object OB is formed on the top surface 211 of the forming table 210. It is desirable that the substrate layer 10 be formed over at least a sufficient area to be capable of covering the base surface of the formed object OB which is formed in the formed object. The expression "the base surface of the formed object OB" means the surface which is supported by the forming table 210 in the formed object OB. The detailed structure and forming method of the structure 11 which configures the substrate layer 10 will be described later.

In a second step, a second forming material is disposed to form the formed object OB to be supported on the plurality of structures 11 which configure the substrate layer 10. More specifically, in the second step, the formed object OB is formed in a state of being supported on the plurality of structures 11 and being separated from the top surface 211 of the forming table 210. In the first embodiment, the control unit 101 forms the formed object OB by stacking material layers ML in the Z direction on the substrate layer 10 using the forming unit 110. The material layers ML are layers which are formed by curing the second forming material which is disposed on the forming table 210. In the first embodiment, the material layers ML are formed by the forming material being discharged from the nozzle 61 of the forming unit 110 onto the substrate layer 10 and being cured. The first forming material which configures the substrate layer 10 and the second forming material which configures the formed object OB may be generated from the same material. Accordingly, it is possible and efficient to omit the labor of preparing the material for forming the substrate layer 10 separately from the material of the formed object OB.

In the first step and the second step, the forming material is disposed on the forming table 210 by the forming unit 110 which uses the flat screw 40. In other words, the two steps may be interpreted as including a step of guiding a material which is supplied to the groove portions 42 to the nozzle 61 while melting the material in the groove portions 42 and discharging the forming material from the nozzle 61 toward the forming table 210 by rotating the flat screw 40.

As described above, in the forming apparatus 100, the generating mechanism of the forming material is miniaturized and the precision of the discharge control of the forming material is increased by the usage of the flat screw 40. As long as the forming apparatus 100 uses the flat screw 40, it is possible to easily and efficiently perform the forming of the substrate layer 10 and the forming of the formed object OB in the first step and the second step.

Incidentally, it is desirable that, when forming the material layers ML, a gap G be maintained between the discharge port 62 of the tip of the nozzle 61 and a top surface OBt of the three-dimensional formed object OB being formed. Here, the expression "the top surface OBt of the three-dimensional formed object OB" means the top surface in the bottom layer in which the forming material is disposed by the discharging of the nozzle 61, and means the planned part at which the forming material which is discharged from the nozzle 61 is deposited in the vicinity of the position directly under the nozzle 61.

It is desirable that the size of the gap G be greater than or equal to the bore diameter Dn (illustrated in FIG. 1) in the discharge port 62 of the nozzle 61, and it is more preferable that the size of the gap G be greater than or equal to 1.1 times the bore diameter Dn. Accordingly, the forming material which is discharged from the discharge port 62 of the nozzle 61 is stacked on the top surface OBt of the formed object OB in a free state in which the forming material is not pushed against the top surface OBt of the formed object OB during the manufacturing. As a result, it is possible to suppress the crushing of the horizontal sectional shape of the forming material which is discharged from the nozzle 61, and it is possible to reduce the surface roughness of the formed object OB. In a configuration in which a heater is provided in the periphery of the nozzle 61, it is possible to prevent the overheating of the material by the heater by forming the gap G, and discoloration and degradation caused by the overheating of the material which is stacked on the formed object OB are suppressed. Meanwhile, it is preferable that the size of the gap G be less than or equal to 1.5 times the bore diameter Dn, and it is particularly preferable that the size of the gap G be less than or equal to 1.3 times the bore diameter Dn. Accordingly, a reduction in the precision with respect to the planned part at which the forming material is to be disposed and a reduction in the close adherence of the forming material to the top surface OBt of the formed object OB during manufacturing are suppressed.

After the forming process is completed, the formed object OB is separated from the forming table 210 in a state in which the entirety or a portion of the substrate layer 10 adheres to the base surface. Subsequently, the substrate layer 10 which is adhered to the formed object OB is removed using a polishing treatment by sandpaper or the like, cutting using a trowel or a cutting tool, or the like.

Figure 6:
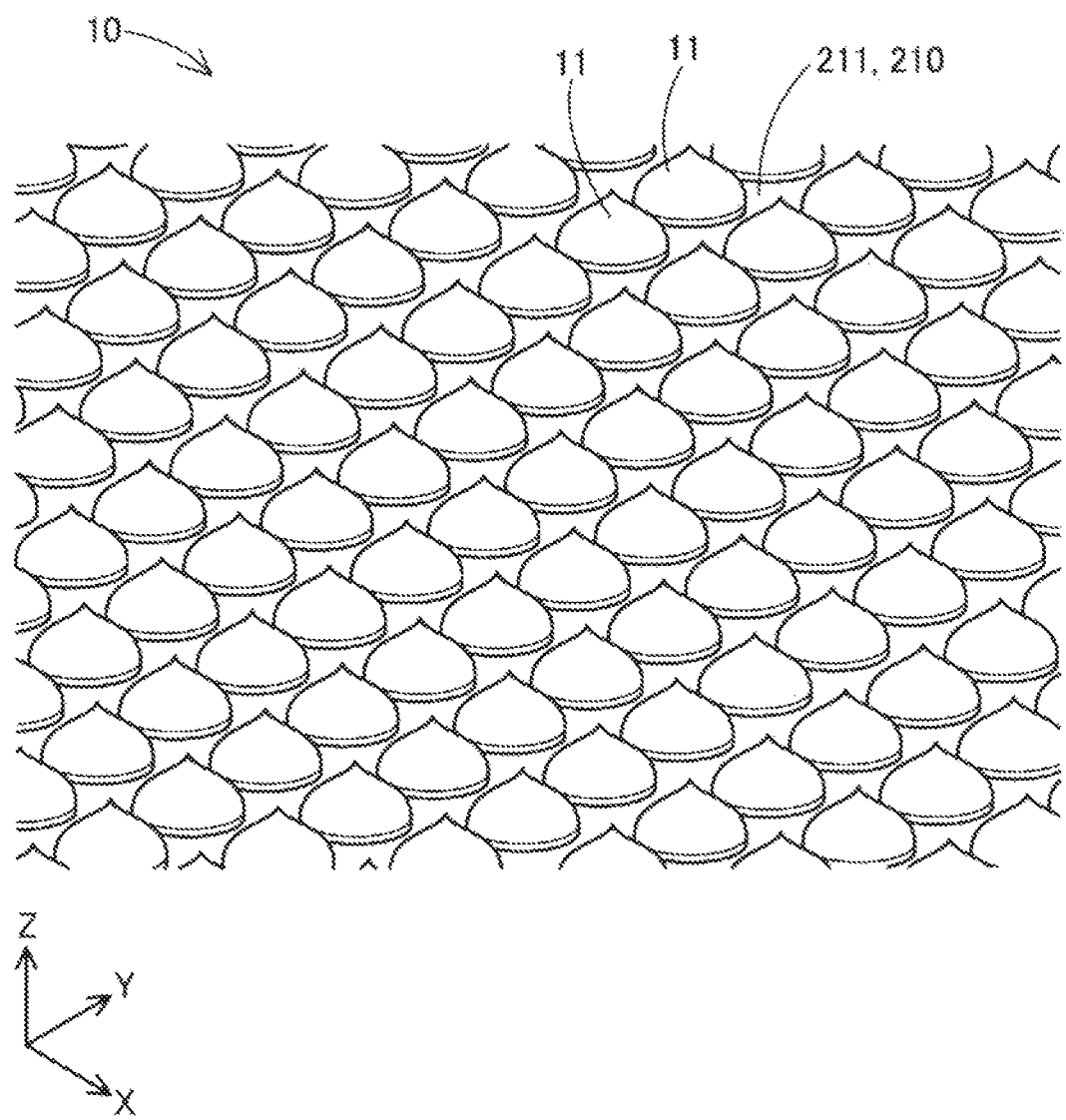
FIG. 6 is a schematic perspective view illustrating a portion of a substrate layer in a first embodiment in an enlarged manner.

FIG. 6 is a schematic perspective view illustrating a portion of the substrate layer 10 in the first embodiment in an enlarged manner. As described above, the substrate layer 10 is configured by a plurality of minute structures 11 which are separated from each other and arranged on the forming table 210. It is desirable that the structures 11 be arranged at an interval at which the material which configures the material layers ML of the formed object OB does not enter between the structures 11 such that the structures 11 are capable of supporting the material layer ML of the bottommost layer of the formed object OB which is stacked on top of the structures 11. The structures 11 may be configured to be of a size in which the maximum value of the width in the horizontal direction is approximately 5 μm to 100 μm, for example. The structures 11 may be arranged to leave an interval of approximately 0.1 mm to several mm therebetween, for example. The structures 11 may be arranged to leave an interval therebetween that is narrower than the maximum value of the width of the structures 11 themselves in the horizontal direction.

Due to the substrate layer 10 the top surface 211 of the forming table 210 assumes a state in which a minute uneven structure is formed. Therefore, in the forming process, the forming material directly after being discharged for the forming of the formed object OB flowing in a direction parallel to the top surface 211 of the forming table 210 from a planned disposing position is suppressed. Since the forming material moving from the position at which the forming material is disposed is suppressed, the contraction of the material layers ML in the X direction and the Y direction when the forming material is cured is suppressed and deformation in which the material layers ML bend is suppressed. Accordingly, the forming precision of the formed object OB is increased.

When the substrate layer 10 is configured by the structures 11 which are arranged to be separated from each other, the strength of the substrate layer 10 is low as compared to a configuration in which the structures 11 are connected to each other. Therefore, it is possible to easily separate the formed object OB from the forming table 210 even if a large external force is not applied. It is possible to easily remove the substrate layer 10 which is adhered to the formed object OB from the formed object OB after the formed object OB is separated from the forming table 210.

As long as the substrate layer 10 is adopted, it is possible to reduce the contact area between the substrate layer 10 and the forming table 210 and the contact area between the substrate layer 10 and the base surface of the formed object OB by reducing the size of the structures 11. As long as the contact area between the substrate layer 10 and the forming table 210 is small, separating the formed object OB from the forming table 210 together with the substrate layer 10 is simplified. As long as the contact area between the substrate layer 10 and the base surface of the formed object OB is small, removing the substrate layer 10 from the formed object OB after the formed object OB and the substrate layer 10 are separated from the forming table 210 is simplified.

As long as the substrate layer 10 is adopted, since the structures 11 are not connected, all of the structures 11 falling from the forming table 210 at once before starting the forming of the formed object OB is suppressed. Accordingly, the arising of problems such as being required to recreate the substrate layer 10 from the start is suppressed.

In the first embodiment, each of the structures 11 has approximately the same height. Accordingly, the inclining of the formed object OB which is formed on the substrate layer 10 during the forming is suppressed and a reduction in the forming precision of the formed object OB is suppressed. It is desirable that the structures 11 be arranged tightly in an arrangement pattern having a uniform distribution density. Accordingly, it is possible to support the formed object OB in a more stable posture.

In the first embodiment, each of the structures 11 has approximately the same shape. Therefore, it is possible to form the structures 11 by repeating discharging operations of the forming material from the single nozzle 61. Therefore, it is possible to efficiently and easily form the substrate layer 10. The discharging operations of the forming material for forming the structures 11 will be described later.

In the first embodiment, each of the structures 11 has approximately a shape which narrows toward the top. In more detail, the sectional area of a cross-section along the top surface 211 of the forming table 210 of each of the structures 11 has a shape which decreases in size toward the top. According to this configuration, the strength of each of the structures 11 decreases the closer the position on the structure 11 is to the formed object OB. The contact area of each of the structures 11 with respect to the base surface of the formed object OB is reduced. Therefore, the removal of the substrate layer 10 from the formed object OB after the forming process is further simplified.

In particular, in the first embodiment, the top end of each of the structures 11 has a pointed shape. Therefore, the strength of the connecting portion between the formed object OB and the substrate layer 10 is still lower and the contact area between the formed object OB and the substrate layer 10 is still smaller. Therefore, the removal of the substrate layer 10 from the formed object OB after the forming process is further simplified.

A description will be given of the forming method of the structures 11 which configure the substrate layer 10 with reference to FIGS. 7A and 7B. In the first embodiment, the structures 11 are formed using a step of intermittently repeating the discharging of the forming material from the nozzle 61 onto the forming table 210 to dot the structures 11 on the forming table 210. The expression "dot the structures 11" means to arrange the plurality of dot-shaped structures 11 in a state of being separated from each other. Here, "dot-shaped" is not only a substantially circular shape, but also includes shapes which are not longitudinal. The control unit 101 causes the discharging unit 60 to repeat the following discharging operations of the forming material at the predetermined position of each of the structures 11.

Figure 7A:
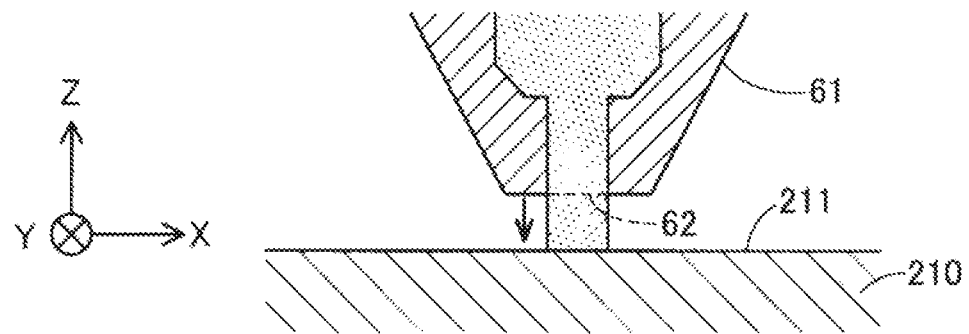
FIG. 7A is a first schematic diagram illustrating a forming process of a structure in the first embodiment.

Reference will be given to FIG. 7A. First, the control unit 101 causes the forming material to be discharged from the nozzle 61 at the forming position of the structure 11 until the tip of the forming material comes into contact with the top surface 211 of the forming table 210.

Subsequently, the control unit 101 drives the opening-closing mechanism 71 to close the flow path 65 using the valve body 73 and stops the discharging of the forming material from the nozzle 61.

Figure 7B:
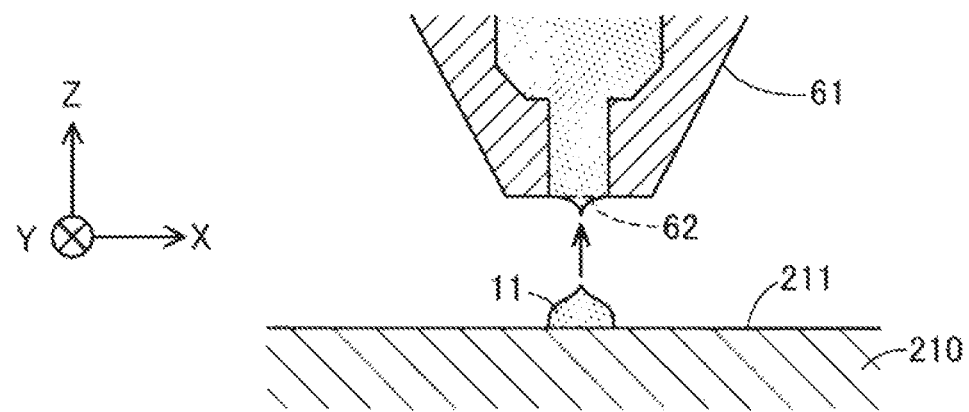
FIG. 7B is a second schematic diagram illustrating a forming process of the structure in the first embodiment.

Reference will be given to FIG. 7B. Next, the control unit 101 modifies the position of the nozzle 61 with respect to the forming table 210 such that the nozzle 61 separates upward from the top surface 211 of the forming table 210 in a state in which the discharging of the forming material from the nozzle 61 is stopped. More specifically, the control unit 101 causes the forming table 210 to move downward using the movement mechanism 230 and increases the distance between the nozzle 61 and the forming table 210 in the Z direction. At this time, it is desirable that the control unit 101 cause a negative pressure to be generated inside the nozzle 61 using the suction mechanism 75 such that the flowing of the forming material inside the nozzle 61 out from the discharge port 62 is suppressed. According to this step, since the forming material which is adhered to the forming table 210 is parted from the forming material inside the nozzle 61 while being pulled toward the nozzle 61, the structure 11 having a shape which narrows toward the top end is formed.

The control unit 101 controls the movement mechanism 230 to position the nozzle 61 at the forming position of the next structure 11 on the forming table 210 and executed the discharging step again. The structures 11 which configure the substrate layer 10 are formed by repeating the operations which are described above. Using this method, since the substrate layer 10 is configured by the dotted structures 11, it is possible to further lower the strength of the substrate layer 10 and it is possible to further reduce the contact area of the substrate layer 10 with respect to the base surface of the formed object OB and with respect to the forming table 210. Since it is possible to form each of the structures 11 at a minute size corresponding to the bore diameter Dn in the discharge port 62 of the nozzle 61, it is possible to form the substrate layer 10 to be finer.

When forming the substrate layer 10, the control unit 101 may change the interval between the structures 11 which configure the substrate layer 10 according to the size, weight, and the like of the formed object OB which is formed on the substrate layer 10. More specifically, the control unit 101 may perform control such that the greater the size, the weight, or the like of the formed object OB, the narrower the gap between the structures 11. Accordingly, it is possible to stably support the formed object OB which has a great size, weight, or the like using the substrate layer 10 and it is possible to increase the forming precision of the formed object OB.

As described above, according to the manufacturing method of the formed object OB of the first embodiment and the forming apparatus 100 which executes the manufacturing method, since the formed object OB is formed using the substrate layer 10 which forms the minute uneven structure on the top surface 211 of the forming table 210, it is possible to suppress the formed object OB during the forming. Accordingly, the forming precision of the formed object OB is increased. Since it is possible to form the substrate layer 10 which has a small contact area with respect to the base surface of the formed object OB and with respect to the forming table 210, it is possible to simplify the separation of the formed object OB from the forming table 210 and the removal of the substrate layer 10 from the formed object OB. Additionally, according to the manufacturing method of the formed object OB of the first embodiment and the forming apparatus 100 which executes the manufacturing method, it is possible to realize the various operations and effects which are described in the first embodiment.

2. Second Embodiment

A description will be given of the manufacturing method of the formed object in the second embodiment with reference to FIGS. 8 and 9. The manufacturing method of the formed object in the second embodiment is substantially the same as the one described in the first embodiment other than in that the shape of structures 11a which configure a substrate layer 10a and the forming method thereof are different. The manufacturing method of the second embodiment is executed in the forming apparatus 100 which is described in the first embodiment.

Figure 8:
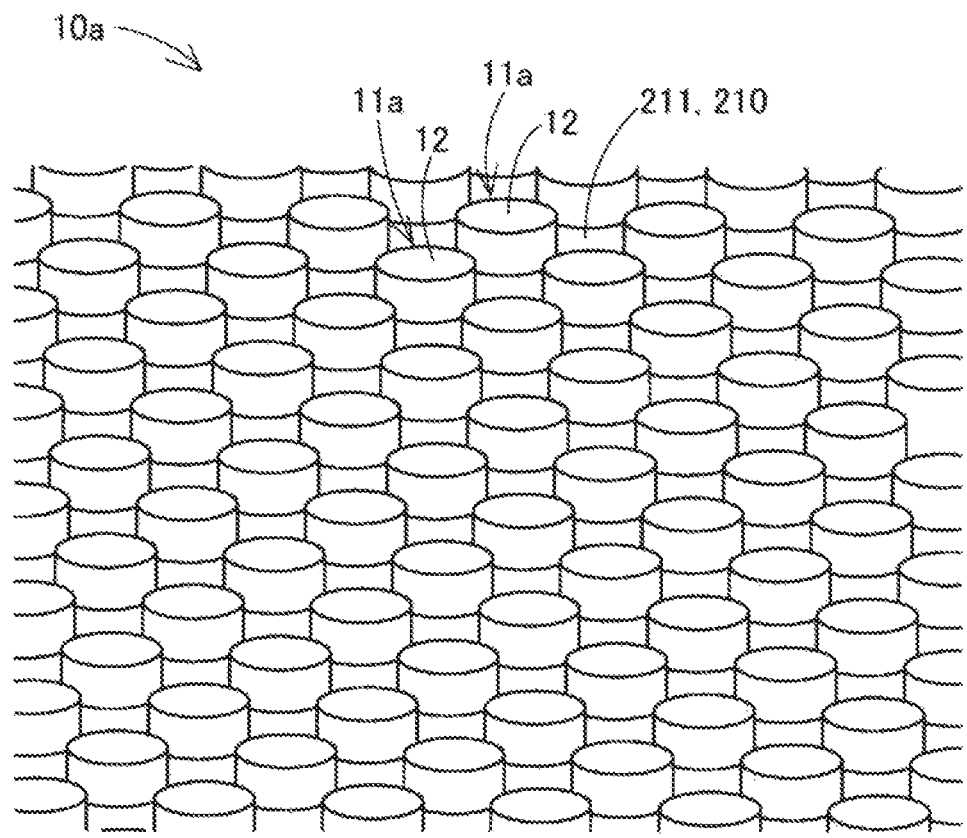
FIG. 8 is a schematic perspective view illustrating a portion of a substrate layer in a second embodiment in an enlarged manner.

FIG. 8 is a schematic perspective view illustrating a portion of the substrate layer 10a in the second embodiment in an enlarged manner. In the substrate layer 10a of the second embodiment, each of the structures 11a is configured to include a top end surface 12 and the structures 11a run along the top surface 211 of the forming table 210. The size and the arrangement interval of the structures 11a of the second embodiment may be similar to the size and the arrangement interval of the structures 11 which are described in the first embodiment.

Figure 9:
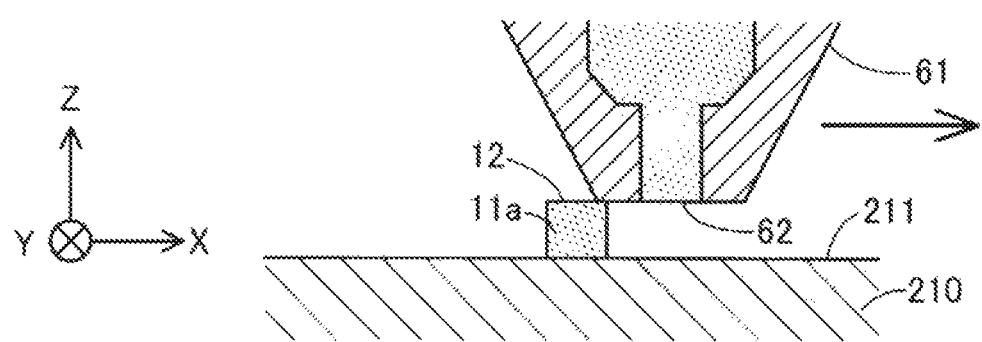
FIG. 9 is a schematic diagram illustrating a forming process of a structure in the second embodiment.

FIG. 9 is a schematic diagram illustrating the forming process of the structure 11a in the second embodiment. In the same manner as described with reference to FIG. 7A in the first embodiment, the control unit 101 first discharges the forming material from the nozzle 61 at the forming position of the structure 11a until the tip of the forming material comes into contact with the top surface 211 of the forming table 210 and subsequently stops the discharging. As illustrated in FIG. 9, the control unit 101 causes the nozzle 61 to move in a direction parallel to the top surface 211 of the forming table 210 with the distance between the nozzle 61 and the top surface 211 of the forming table 210 maintained in a state in which the discharging of the forming material from the nozzle 61 is stopped. More specifically, the control unit 101 uses the movement mechanism 230 to cause the forming table 210 to be displaced in the horizontal direction to cause the position of the nozzle 61 to be displaced in the horizontal direction with respect to the forming table 210. It is desirable that the scanning of the nozzle 61 be executed at a timing at which the forming material which is discharged from the nozzle 61 is cured to a certain degree on the forming table 210.

The forming material which is adhered to the forming table 210 and the forming material inside the nozzle 61 are parted by the scanning of the nozzle 61. The top end portion of the forming material which is adhered to the forming table 210 is scraped by the tip of the nozzle 61 and the top end surface 12 which is flat and goes along the top surface 211 of the forming table 210 is formed. The control unit 101 controls the movement mechanism 230 to cause the nozzle 61 to move to the forming position of the next structure 11 on the forming table 210 and executes the discharging step again. The structures 11a which configure the substrate layer 10a are formed by repeating the operations which are described above. In the second embodiment, since the opening shape of the discharge port 62 of the nozzle 61 is substantially circular, the structure 11a is formed in a circular column shape. In the forming process of the structure 11a, the nozzle 61 may be displaced in the Z direction in order to adjust the height of the structure 11a when discharging the forming material.

As long as the substrate layer 10a of the second embodiment is adopted, it is possible to stably support the material layers ML which configure the formed object OB using the top end surfaces 12 of the structures 11a. Accordingly, it is possible to support the formed object OB at a more stable posture during the forming and the forming precision of the formed object OB may be increased. Additionally, according to the manufacturing method of the formed object of the second embodiment and the forming apparatus 100 which executes the manufacturing method, in addition to the various operations and effects which are described in the second embodiment, it is possible to realize various operations and effects which are similar to those described in the first embodiment.

3. Third Embodiment

A description will be given of the manufacturing method of the formed object in the third embodiment with reference to FIGS. 10A and 10B. The manufacturing method of the formed object in the third embodiment is the same as the manufacturing methods which are described in the first embodiment and the second embodiment other than in that the manufacturing method of the formed object in the third embodiment includes a step of stacking a plurality of the structures 11 or 11a which configure the substrate layer 10 or 10a which are described in the first embodiment and the second embodiment to form a multi-layer structure 15 or 15a which includes voids in the inner portion of the multi-layer structure 15 or 15a. The manufacturing method of the third embodiment is executed in the forming apparatus 100 which is described in the first embodiment.

Figure 10A:
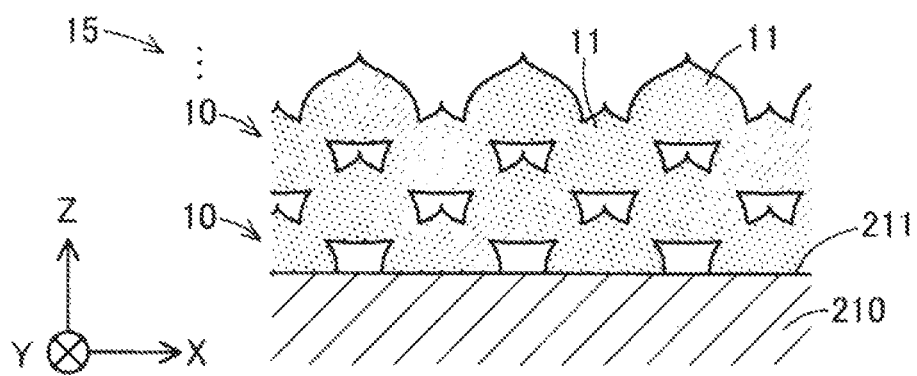
FIG. 10A is a schematic diagram illustrating the configuration of a first multi-layer structure.
Figure 10B:
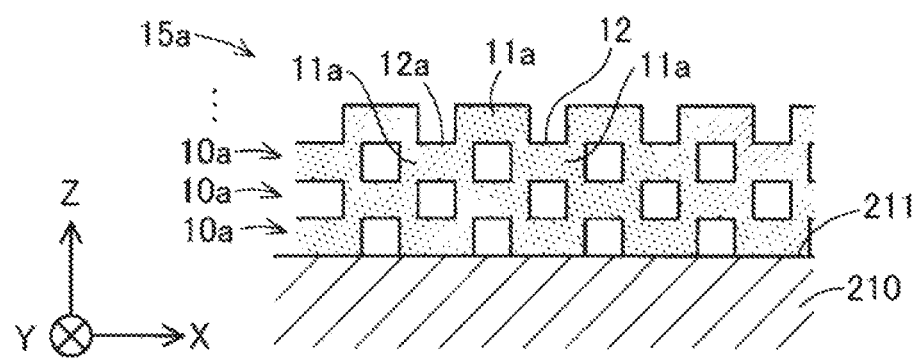
FIG. 10B is a schematic diagram illustrating the configuration of a second multi-layer structure.

FIG. 10A is a schematic diagram illustrating the configuration of the first multi-layer structure 15 which is formed by stacking a plurality of the substrate layers 10 which are described in the first embodiment. FIG. 10B is a schematic diagram illustrating the configuration of the second multi-layer structure 15a which is formed by stacking a plurality of the substrate layers 10a which are described in the second embodiment. In the step of stacking the substrate layers 10 or 10a, the structures 11 or 11a which configure the substrate layers 10 or 10a of the upper layers are formed to straddle on top of the plurality of structures 11 or 11a which are adjacent on the substrate layers 10 or 10a of the lower layers. Therefore, in the third embodiment, the interval between the structures 11 or 11a which are adjacent to each other is set to be smaller than the widths of the base surfaces of the structures 11 or 11a which are stacked above.

The multi-layer structures 15 and 15a have a fine uneven structure on the top surface and the bottom surface and have a porous configuration including voids in the inner portion. According to the multi-layer structures 15 and 15a, due to the uneven structure of the top surface and the bottom surface, the contacting parts between the formed object OB and the forming table 210 are reduced in size. The strength of the multi-layer structures 15 and 15a is reduced by the presence of voids in the inner portions thereof. Accordingly, the separation of the formed object OB from the forming table 210 and the removal of the formed object OB from the bed are simplified. Additionally, according to the manufacturing method of the formed object of the third embodiment and the forming apparatus 100 which executes the manufacturing method, in addition to the various operations and effects which are described in the third embodiment, it is possible to realize various operations and effects which are similar to those described in the first embodiment and the second embodiment.

4. Fourth Embodiment

It is possible to modify the various configurations which are described in the embodiment in the manners described hereinafter, for example. All of the other embodiments which are described hereinafter are posited as examples for embodying the invention in the same manner as the embodiment which is described above.

4-1. First Other Embodiment

The configuration of the structure which configures the substrate layer is not limited to the configurations of the structures 11 and 11a which configure the substrate layers 10 and 10a which are described in the embodiments. The size, the arrangement interval, the shape, and the like of the structure may be modified according to the shape, the weight, and the like of the formed object OB which is formed on the top of the structure. The substrate layer may have a configuration including structures having a linear longitudinal shape extending along the top surface 211 of the forming table 210, for example. The substrate layer may be configured by structures which are arranged on the top surface 211 of the forming table 210 in a non-uniform pattern, for example. The substrate layer may be configured by a thermoplastic material of a different type from the formed object OB. Dot-shaped structures having a different shape from the shapes of the structures 11 and 11a which are described in the embodiments by forming the opening shape of the nozzle 61 in a shape other than a circle.

4-2. Second Other Embodiment

The forming unit 110 may include a configuration which rotates a screw which is longer in the Z direction than the diameter to extrude the forming material from the nozzle 61, for example, instead of the configuration which uses the flat screw 40. Alternatively, the forming unit 110 may include a configuration which extrudes a filament-shaped thermoplastic resin material from the nozzle 61 while melting the resin material using heat to adhere the resin material to the forming table 210 instead of the configuration in which the forming material is discharged toward the forming table 210.

4-3. Third Other Embodiment

The opening-closing mechanism 71 of the forming apparatus 100 may be configured by a shutter which moves to intersect the direction in which the forming material flows inside the flow path 65. The opening-closing mechanism 71 may be configured by a plunger in which a piston protrudes into the flow path 65 to block the flow path 65. The opening-closing mechanism 71 may be configured by combining two or more of the butterfly valve which is described in the embodiment, a shutter mechanism which uses a shutter, and a plunger. The suction mechanism 75 may be omitted from the forming apparatus 100.

4-4. Fourth Other Embodiment

A filament-shaped material may be inserted into the material supply unit 20 instead of a powder or a pellet-shaped material. The material which is inserted into the material supply unit 20 is not limited to those which are described in the embodiments, and other resin materials, metal materials, and ceramic materials may be used. In the forming apparatus 100, the formed object may be formed by a material which is used in metal powder injection molding (MIM), for example.

4-5. Fifth Other Embodiment

The first forming material which forms the plurality of structures 11 or 11a may be generated from a different material from the second forming material which forms the formed object OB. For example, the first forming material may be generated from a material which configures a water-soluble support material, for example.

4-6. Sixth Other Embodiment

In the embodiment, the material supply unit 20 may include a configuration which includes a plurality of hoppers. In this case, a different material may be supplied from each hopper to the flat screw 40 and be mixed inside the groove portions 42 of the flat screw 40 to generate the forming material. For example, a powder material which serves as the main material which is described in the embodiment and solvents, binders, and the like which are added to the powder material may be supplied to the flat screw 40 from separate hoppers in parallel.

4-7. Seventh Other Embodiment

In the embodiment, a portion or all of the functions and processes which are realized using software may be realized using hardware. A portion or all of the functions and processes which are realized using hardware may be realized using software. It is possible to use various circuits such as integrated circuits, discrete circuits, or circuit modules which combine such circuits, for example, as the hardware.

5. Other Aspects

The invention is not limited to the embodiments and application examples which are described above and it is possible to realize the invention with various aspects in a scope that does not depart from the gist of the invention. For example, it is possible to realize the invention as the following aspects. Hereinafter, in order to solve a portion or all of the problems of the invention, or alternatively, in order to achieve a portion or all of the effects of the invention, it is possible to replace or combine, as appropriate, the technical features in the embodiments corresponding to technical features in the aspects which are described hereinafter. As long as a technical feature is not described as required in the specification, it is possible to remove the technical feature, as appropriate.

(1) The first aspect is provided as a manufacturing method of a three-dimensional formed object. The manufacturing method includes a first disposing of a first forming material on a forming table to form a plurality of structures which are separated from each other, and a second disposing of a second forming material for forming the three-dimensional formed object such that the three-dimensional formed object is supported by the plurality of structures in a state of being separated from the forming table.

According to the manufacturing method, since it is possible to use an uneven structure which is formed by the plurality of structures which functions as a bed to suppress the movement which accompanies the flowing and the contraction deformation of the forming material for forming the three-dimensional formed object, it is possible to increase the forming precision of the three-dimensional formed object. Since the bed is configured by the plurality of structures which are separated from each other, it is possible to reduce the strength of the bed. Accordingly, it is possible to simplify the separation of the three-dimensional formed object from the forming table and the removal of the bed from the three-dimensional formed object.

(2) In the manufacturing method, the first disposing may include intermittently discharging the first forming material from a nozzle onto the forming table to form the plurality of dot-shaped structures.

According to the manufacturing method, since the bed is configured by the dotted structures instead of a configuration in which longitudinal structures are arranged, it is possible to further lower the strength of the bed itself. Due to the intermittent discharging of the forming material from the nozzle, it is possible to simplify the structures which configure the bed, which is efficient.

(3) In the manufacturing method, the first disposing may include forming the structures, each having a shape which narrows toward the top thereof, by causing the nozzle to separate upward from the forming table in a state in which discharging of the first forming material from the nozzle is stopped after the first forming material is discharged from the nozzle onto the top surface of the forming table.

According to the manufacturing method, it is possible to reduce the strength of each of the structures the closer the position on the structure is to the three-dimensional formed object. Accordingly, the removal of the bed from the three-dimensional formed object is simplified.

(4) In the manufacturing method, the first disposing may include forming top end surfaces of the structures which run along a top surface of the forming table by causing the nozzle to move in a direction which is parallel to the top surface in a state in which discharging of the first forming material from the nozzle is stopped after the first forming material is discharged from the nozzle onto the top surface.

According to the manufacturing method, the disposition posture of the three-dimensional formed object during the forming is stabilized due to each of the structures configuring the bed having a top end surface. Therefore, the forming precision of the three-dimensional formed object may be increased.

(5) In the manufacturing method, the first forming material and the second forming material may be generated by melting at least a portion of a material which is supplied to a rotating flat screw.

According to the manufacturing method of the aspect, it is possible to miniaturize the structure which generates the forming material by using the flat screw. By using the flat screw, the precision of the discharge control of the first forming material and the second forming material from the nozzle is increased and the forming of the bed and the forming of the three-dimensional formed object may be performed easily and efficiently.

(6) The manufacturing method may further include stacking a plurality of the structures to form a multi-layer structure which includes voids in an inner portion of the multi-layer structure and which supports the second forming material.

According to the manufacturing method, it is possible to configure the bed of the three-dimensional formed object using the multi-layer structure which has a lowered strength due to including voids in the inner portion.

(7) In the manufacturing method, the first forming material may be generated from the same material as the material of the second forming material.

According to the manufacturing method, since it is possible to form the three-dimensional formed object using the same material without changing the material after forming the plurality of structures which configure the bed, the manufacturing method is efficient.

(8) The second aspect is provided as a forming apparatus of a three-dimensional formed object. A forming apparatus includes a forming unit which disposes a first forming material on a forming table to form a plurality of structures which are separated from each other and disposes a second forming material for forming the three-dimensional formed object such that the three-dimensional formed object is supported by the plurality of structures in a state of being separated from the forming table.

According to the forming apparatus, since the three-dimensional formed object is formed in a state of being supported by the bed which is configured by the plurality of structures, the forming precision of the three-dimensional formed object may be increased. Since it is possible to configure the bed having a low strength using the plurality of structures, the separation of the three-dimensional formed object from the forming table and the removal of the bed from the three-dimensional formed object are simplified.

It is also possible to realize the invention in various aspects other than the manufacturing method or the forming apparatus of the three-dimensional formed object. For example, it is possible to realize the invention in aspects such as the forming method of the bed of the three-dimensional formed object which is disposed on the forming table, the bed, and the structure thereof. It is possible to realize the invention using a control method of the device, a computer program for realizing the method, a non-transitory storage medium on which the computer program is stored, or the like.

What is claimed is:

1. A manufacturing method of a three-dimensional object, the method comprising:
    preparing a forming table extending along a plane, the plane being along an X axis and a Y axis orthogonal to each other;
    first disposing a first forming material on the forming table to form a first plurality of structures as one layer extending along the X axis and the Y axis, the first plurality of structures being separated from each other along the X axis or the Y axis on the forming table, a space being formed along the X axis or the Y axis between each adjacent two structures of the first plurality of structures;
    repeating the first disposing of the first forming material on the previously formed first plurality of structures to form another first plurality of structures as one layer extending along the X axis and the Y axis, the repeatedly formed first plurality of structures corresponding to a multi-layer structure which includes a plurality of voids in an inner portion of every layer of the repeatedly formed first plurality of structures of the multi-layer structure, the plurality of voids being located along a Z axis orthogonal to the X axis and the Y axis;
    second disposing a second forming material on the multi-layer structure of the repeatedly formed first plurality of structures to form the three-dimensional object, the three-dimensional object being supported by the multi-layer structure, the three-dimensional object being spaced apart from the forming table via the multi-layer structure; and
    separating the three-dimensional object and the multi-layer structure from the forming table,
    wherein the plurality of voids are arranged in a matrix in a cross section along a plane of the Z axis and one of the X axis or the Y axis of the multi-layer structure when viewed along the other of the X axis or the Y axis, and two adjacent voids of the plurality of voids are spaced apart from each other along the X axis, the Y axis, and the Z axis.

2. The manufacturing method according to claim 1, wherein the first disposing of the first forming material includes intermittently discharging the first forming material from a nozzle onto the forming table to form a plurality of dot-shaped structures as the first plurality of structures.

3. The manufacturing method according to claim 2, wherein the first disposing of the first forming material includes:
   stopping the first disposing of the first forming material after the first disposing of the first forming material is performed on the forming table; and
   moving the nozzle upwardly along the Z axis while the first disposing of the first forming material is stopped so as to form each of the plurality of dot-shaped structures, and
each of the plurality of dot-shaped structures has a shape in which a volume of the first forming material decreases from a bottom toward a top thereof.

4. The manufacturing method according to claim 2, wherein the first disposing of the first forming material includes:
   stopping the first disposing of the first forming material after the first disposing of the first forming material is performed on the forming table; and
   moving the nozzle laterally along the X axis or the Y axis while the first disposing of the first forming material is stopped so as to form each of the plurality of dot-shaped structures, and
a top surface of each of the plurality of dot-shaped structures extends along the forming table.

5. The manufacturing method according to claim 2, wherein the first forming material and the second forming material are generated by melting at least a portion of a material which is supplied to a rotating flat screw.

6. The manufacturing method according to claim 1, wherein the first forming material and the second forming material are generated from a same material.

* * * * *